United States Patent [19]

Gretsch

[11] 4,419,618
[45] Dec. 6, 1983

[54] ON-BOARD VEHICULAR NETWORK METHOD FOR EFFICIENT GENERATOR UTILIZATION

[75] Inventor: Ralf Gretsch, Erlangen, Fed. Rep. of Germany

[73] Assignee: Robert Bosch GmbH, Stuttgart, Fed. Rep. of Germany

[21] Appl. No.: 313,649

[22] Filed: Oct. 22, 1981

[30] Foreign Application Priority Data

Nov. 3, 1980 [DE] Fed. Rep. of Germany ....... 3041201

[51] Int. Cl.³ .......................... H02P 9/04; H02J 7/14
[52] U.S. Cl. ........................................ 322/7; 322/29; 322/90; 322/95; 320/61
[58] Field of Search .......................... 322/7, 8, 29–32, 322/33, 90, 93–96; 320/35, 61, 67, 68, 57, 59, DIG. 2

[56] References Cited

U.S. PATENT DOCUMENTS

| | | | |
|---|---|---|---|
| 3,378,755 | 4/1968 | Sawyer | 322/29 |
| 3,602,798 | 8/1971 | Shibata et al. | 322/93 |
| 3,710,228 | 1/1973 | Higashino | 322/94 X |
| 3,932,765 | 1/1976 | Townsend | 322/29 X |
| 4,066,957 | 1/1978 | Seeger | 322/29 X |

*Primary Examiner*—R. J. Hickey

*Attorney, Agent, or Firm*—Frishauf, Holtz, Goodman & Woodward

[57] ABSTRACT

To utilize the full power capacity of alternators 1, the alternator phases are connected through a transformer 9 to the rectifier 4 which provides rectified output to a battery 8. The transformer 9 has tapped windings, the taps being placed in circuit with the alternator-rectifier network in dependence on a speed control signal, for example derived from the frequency of the alternator, to effect tap changing and matching of the internal impedance of the alternator 1 to the battery 8/load L combination. In accordance with one feature (FIGS. 2, 3), the taps are on the primary, and a-c switches such as triacs 15 are selectively energized as the speed of the generator changes; in accordance with another embodiment (FIGS. 4, 5), the taps are on the secondary of the transformer, and unilaterally conductive switches, such as thyristors or SCRs 48, can be used, in parallel with the rectifier diodes 47 of the rectifying array, and selectively fired as a function of speed. A nominal 35 A output alternator thus can provide secondary output currents which, in one embodiment (FIG. 3) may go to over 80 A or, in the other (FIG. 5), to over 55 A, the closeness of matching and eventual output power depending on the voltage rating of the alternator and the number of taps on the transformer, and hence the degree of match obtainable.

25 Claims, 5 Drawing Figures

ON-BOARD VEHICULAR NETWORK METHOD FOR EFFICIENT GENERATOR UTILIZATION

The present invention relates to on-board vehicular electrical networks, for example for automotive use, on railway cars, on shipboard, and the like, in which an alternating current generator is driven at highly variable speeds, subjected to widely varying environmental and temperature conditions, the output being rectified to charge a floating battery, and supply loads of widely varying loading values.

BACKGROUND

Vehicles, for example automotive vehicles, boats, railway cars, and other mobile equipment, have self-contained on-board electrical networks which, usually, are supplied with electrical energy from an alternator which is coupled either to the prime mover or to the wheels of the vehicle. The speeds of operation vary widely. The loading on the alternator can vary widely; and, further, due to the mobile operation, the temperature to which the alternator and the other components, and specifically a floating battery is subjected, also can vary widely. Voltage regulators are customarily connected to the alternator to control the field current therethrough to maintain the output voltage at an approximately constant level. The field current is so controlled, typically by on-off control by mechanical or solid-state voltage regulators, to maintain an average current through the exciter or field winding of the alternator for at least approximately constant voltage output.

Automotive-type vehicles, particularly those operating in cold winter operations, are subjected to special requirements. Under cold winter conditions, the inner resistance of the battery connected to the on-board vehicular network increases appreciably. The cold starting power available from the battery thus drops rapidly, and battery charge problems result, especially at low engine speeds. This difficulty is increased if the vehicle is used in urban traffic, that is, under conditions under which the engine does not operate at higher speeds. Some equipment to which the vehicle is connected cannot tolerate over-voltages; excessive voltages are extremely damaging to a battery, and may destroy transitorized on-board equipment. Battery charging problems, particularly upon low operating engine speed, and especially when coupled with low temperatures, arise, and, in order to meet requirements, the design of the on-board vehicular network usually is a compromise between the requirements of sufficient battery charge on the one hand, and, on the other, maintenance of a maximum voltage below that which might cause damage to voltage-sensitive equipment installed in the vehicle. This compromise results in inefficient energy balance in operation of the alternator. In city traffic, the power reserve available from the alternator may be marginal and, under excessive city operating conditions, the battery may gradually discharge. Yet, the generator, due to its winding capacity and wiring layout, is capable of substantially higher power output since it is capable of supplying more power at sustained higher voltage operation.

THE INVENTION

It is an object to improve the efficiency of generation of electrical power for an on-board vehicular network so that the available power output capacity of alternators can be efficiently utilized.

Briefly, a transformer with tapped windings is connected between the outputs of the alternator and the rectifier network. The taps are selectively placed in position by switches, preferably semiconductor switches, which are selectively energized based on sensed speed of the alternator. Speed signals can be derived by analyzing the frequency of the output of the alternator.

In accordance with a feature of the invention, the switches selectively connecting the taps are triacs connected between the outputs of the phase terminals of the alternator and the primary taps of the transformer; the secondaries are directly connected to the rectifier bridge. In accordance with another feature of the invention, the secondary is tapped, the primaries being fixedly connected to the phase outputs of the alternator. One of the tap points of the secondary is connected to the rectifier diodes, present in the rectifier network; another tap point is connected to a thyristor which is selectively energized, in phase, with the alternator based on the speed of the alternator; the thyristor, turning OFF, as the voltage wave goes through null, acts, itself, as a diode. This type of network is particularly inexpensive since the very same unit which provides for tap-switching can be used to provide, as well, for rectification of the output.

In accordance with a preferred feature of the invention, each one of the phases of a three-phase alternator has a transformer winding associated therewith, in which the transformer winding has at least one additional tap, possibly two additional taps, each one controlled by a respective switch, typically the triac or thyristor above referred to. The variable transformation ratios which are thus obtained permit matching of the reflected load impedance to the impedance of the generator itself, as the generator impedance changes with change in speed. Speed-responsive switching between the transformer taps, either on the primary or on the secondary, can be readily effected by integrating the switches as semiconductor switches in the rectifier system of the alternator which must be present anyway in order to supply a battery from the alternator output.

The system has the advantage that the current carrying capacity of the generator windings can be fully utilized throughout the range of operation of the alternator, as its speed changes. Additionally, it is easily possible to also modify the field excitation, as a function of speed, by utilizing signals available, anyway, in the system. Temperature of the battery can be introduced as a correction signal by adding a signal derived from a temperature sensor, as modified by a function generator, to a switching control signal, if the temperature is low, and the speed of the engine is low, field energization is inhibited.

DRAWINGS

Figure 1:
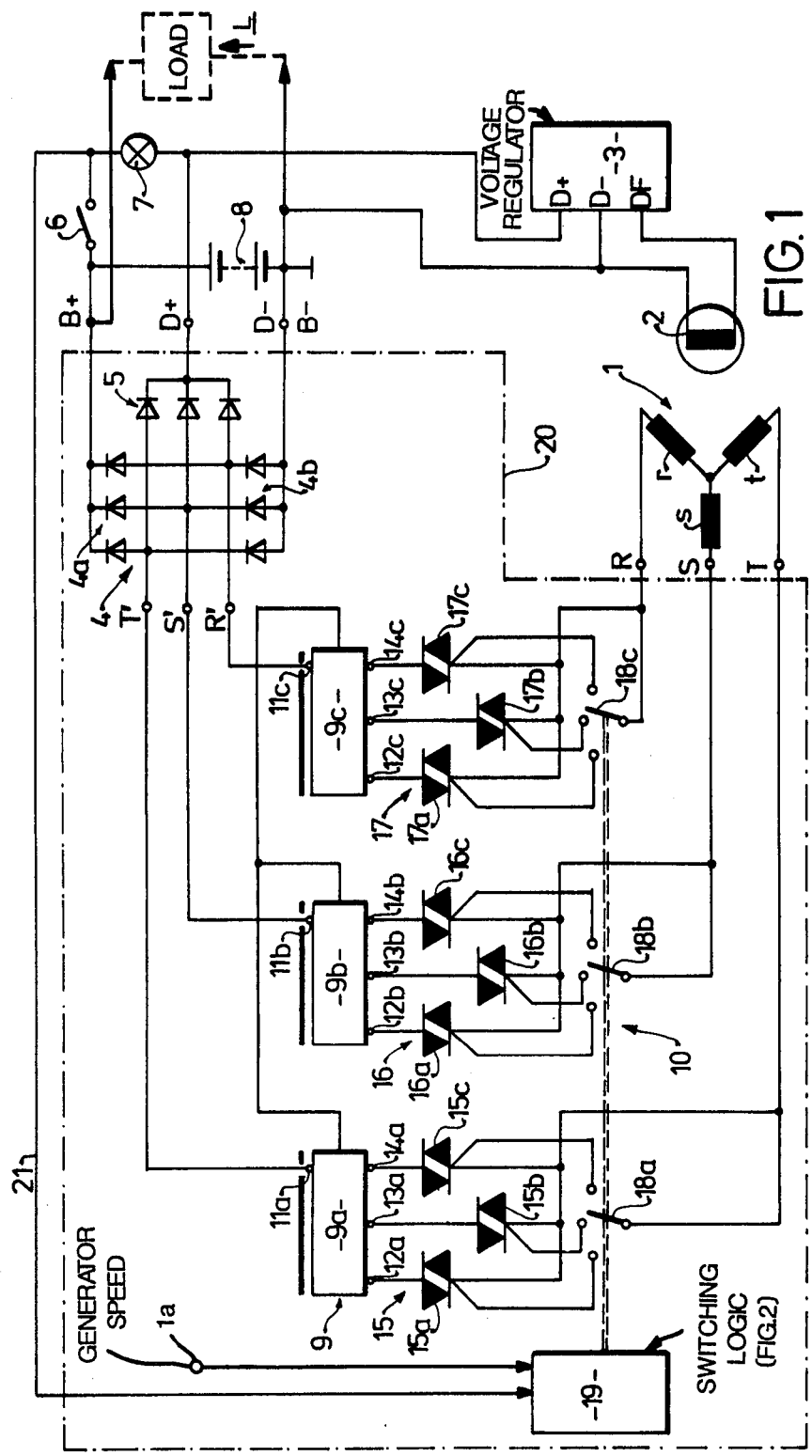
FIG. 1 is a schematic general block diagram of an embodiment of the invention, in which switching of the taps of the transformers is effected at the primary.

Basic structure, with reference to FIG. 1: An alternator 1 has three phase windings r, s, t, arranged in star connection. Excitation field is supplied from an exciter or field winding 2. Voltage of the alternator is controlled by a voltage regulator, which may be of any well known and suitable type, and which has the usual terminals D+, D−, and DF, the field 2 being connected as shown. The output from the alternator 1 is rectified in a rectifying network 4 which has three plus-diodes 4a, three minus-diodes 4b, and three exciter diodes 5, connected to the terminals as is customary. The output terminals B+ and B− are connected to a battery 8 and to the respective terminals of the voltage regulator 3. A main switch 6 which may be the ignition switch or main power control switch for a Diesel engine is connected to a charge control lamp 7 which is further connected to the terminal D+ forming the output of the rectifier diode 5 and the connection to the voltage regulator.

A transformer, generally indicated at 9, is connected between the alternator terminals R, S, T of the alternator 1 and the input terminals R', S', T' to the rectifier network 4. Selectively controllable switches 10 are associated with tap points on a transformer 9. In the embodiment shown in FIG. 1, the transformer 9 and the switches 10 are so connected that the secondaries of the transformers are connected to the rectifier, and the primaries through the switches to the output of the alternator. A separate transformer winding 9a, 9b, 9c is provided when using a three-phase alternator, as shown; of course, it is also possible to use the invention with a single-phase alternator, in which case only a single winding is needed.

The three-phase transformer, as shown in FIG. 1, requires for each phase only one coil with various taps on the primary; the secondary terminals 11a, 11b, 11c are connected to the respective rectifier network inputs T', S', R'; the primary taps 12a, 12b, 12c; 13a, 13b, 13c; 14a, 14b, 14c are connected to respective switches in the form of triacs 15a, 16a, 17a; 15b, 16b, 17b; 15c, 16c, 17c, respectively, forming groups of triacs 15, 16, 17.

For each tap of each phase of the three-phase current to be switched, selectively controllable switches are provided. These switches, as shown in FIG. 1, are connected to the primary and are a-c switches, that is, conductive in both directions. Solid-state switches, triacs as shown, are preferred. The triacs of any one phase have their inputs commonly connected together and to the respective phase output terminals T, S, R of the alternator 1. For selective control of the respective stage of the a-c switches, three-terminal switches 18a, 18b, 18c are provided, connected to the respective gate terminals of the triacs, as shown in FIG. 1. The switches are controlled from a switching logic 19. The switching logic 19 receives a speed signal at terminal 1a, representative of generator speed. Depending on generator speed, the triacs are energized in synchronism, so that an operating condition, representative of predetermined speed of the engine or, rather, of the alternator driven thereby, connects the respective tap of the primary to the generator winding. Thus, for example, the triac 15a, 16a, 17a, connected to the outermost primary taps 12a, 12b, 12c, will be energized, the other two triacs of the respective groups being blocked. Correspondingly, connection to the other stages is equally effected so that, as looked at from the alternator 1, the reflected loading impedance therefor will change. Under ordinary operating conditions, thus, the alternator can operate at its most effective and efficient level, so that higher current output can be obtained therefrom than if only a design compromise has to be satisfied.

The portion of the system within the chain-dotted outline 20 of FIG. 1 requires three a-c alternator connection terminals R, S, T, the power terminals B+ and B−, and the rectifier terminal B+; the rectifier negative terminal D− and the battery terminal B− can be the same. Preferably, the control logic circuit 21 is so connected that, upon opening of the main switch 6, it also is disconnected.

The transformation ratio thus can be changed by selectively energizing the respective transformer taps. The reflected impedance of the load L, as seen by the alternator 1, thus will also change. The variation in generator impedance, with speed, thus can be matched. The degree of matching or the number of matching steps corresponds to the number of taps. As shown, three taps are used; this is usually sufficient since substantial power reserves of a standard alternator can be utilized thereby. More or fewer taps provide for finer or coarser matching, respectively.

Figure 2:
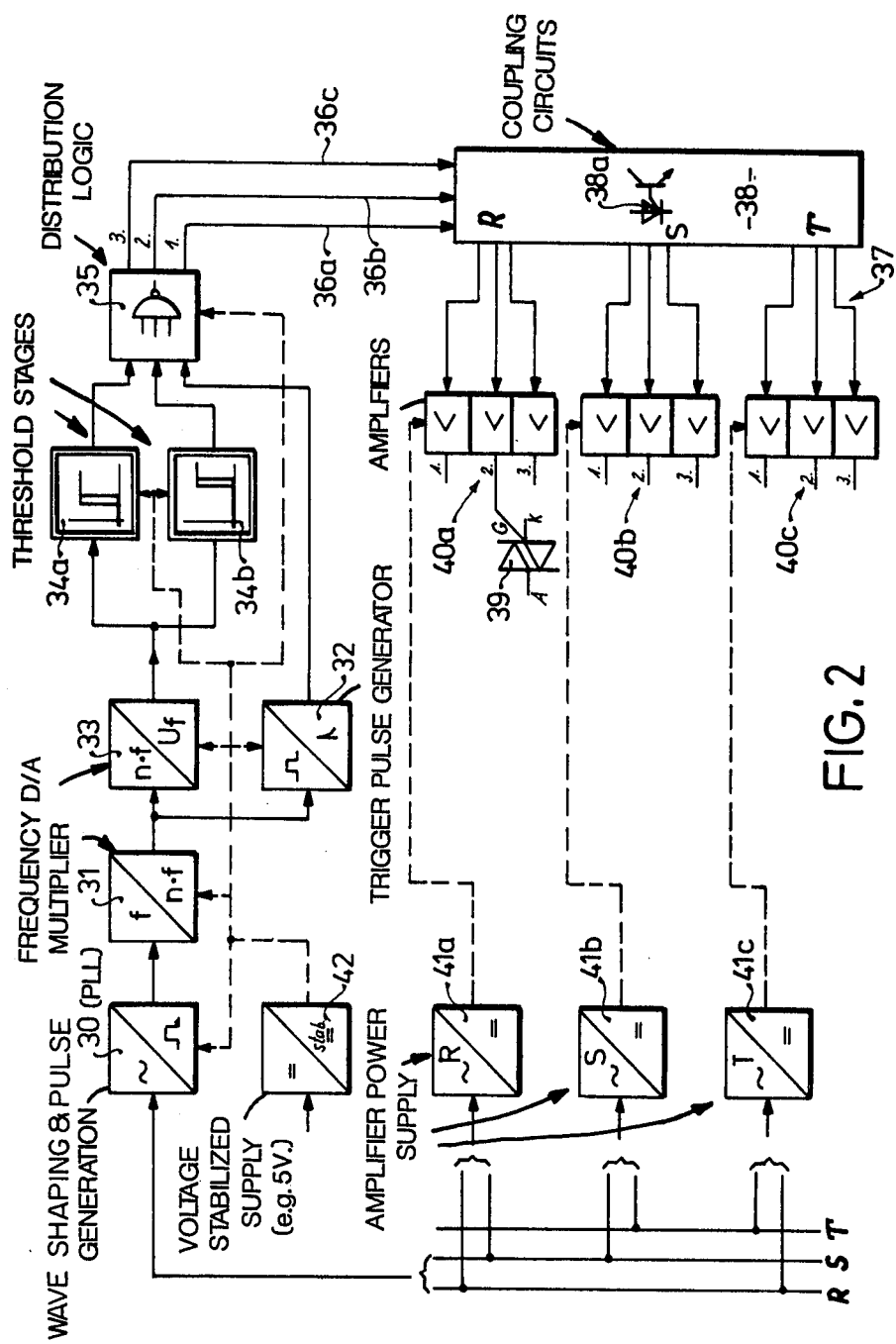
FIG. 2 is a block diagram of a control circuit for the system of FIG. 1.

The switching logic 19 is shown in more detail in FIG. 2. Three triacs which are associated with a respective tap 12, 13, or 14 of the transformer 9 are simultaneously fired. The frequency of the firing pulses, preferably, is a divisible multiple of the alternator phases. The firing or triggering pulses are synchronized with the zero-crossover of a phase, so that the three fired triacs form a continuously conductive connection. The transformer windings 9 are also star-connected. It is, of course, possible to use either star or delta connections for the alternator and/or the transformer.

Ignition or firing pulses are derived from the phase R/S, as shown in FIG. 2, and they are applied first to a wave-shaping and pulse generator circuit 30 which converts the sine wave derived from the alternator to square-wave pulses. The circuit 30 can be in accordance with any well known structure and preferably includes a smoothing or flattening circuit, a voltage limiter, and a trigger stage, such as a monostable multivibrator. The wave-shaping and pulse generation stage 30 thus provides an output signal, as shown in schematic form in FIG. 2, which is a square wave; it is applied to a frequency multiplier 31. The frequency multiplier multiplies the frequency by a predetermined factor n, preferably without introducing any phase shift. A suitable frequency multiplier is a phase locked loop (PLL) circuit, including a counter.

In a preferred embodiment, for a three-phase alternator the multiplication factor n=12, so that the output of the frequency multiplier stage 31 will have firing pulses appear at 30°-el. spaced from each other. A digital-analog converter 33 receives the firing pulses which, of course, repeat with the frequency n.f, and converts them into an electrical voltage $U_f$, which then will be an analog of the frequency and hence the speed of the alternator. The frequency proportional output voltage $U_f$ of the D/A converter 32 is applied to two threshold stages 34a, 34b which, respectively, have different threshold response levels, as schematically indicated. This permits generation of output signals in three discrete ranges, which are derived from the different threshold levels of the stages 34a, 34b and the maximum or mininum threshold of either. Of course, it is not necessary to have the multiplied frequency applied to the D/A converter. Discrimination of speed is then effected by so arranging the threshold stages 34a, 34b that below a pretermined minimum speed, for example 3000 rpm, neither of the threshold stages responds; at a speed between 3000 and 8000 rpm, threshold stage 34a responds; and at a speed in excess of 8000 rpm, threshold stage 34b responds. The speed, in any case, refers to the speed of the alternator, not of the engine, or a prime mover driving the alternator.

The threshold stages 34a, 34b are connected to a distribution logic 35 which, also, receives the output pulses from the trigger generator 32. The distribution logic 35 distributes the respective trigger pulses occurring within 30°-el. to three separate output lines 36a, 36b, 36c, corresponding to stage 1, stage 2 and stage 3 of the respective speed threshold stages, and in dependence on the respective control effected by the threshold stages 34a, 34b. In the example selected, stage 1 provides for energization of only the connecting line 36a, which then so distributes the trigger pulses to energize the respective thyristors of only one transformer tap; upon energization of the respective other lines 36b, 36c, stages 2 and 3 of the respective speeds will cause energization of the other respective triacs, for example 15b, 15c, 16b, 16c, etc. Based on this operation, the structure of the logic circuit 35 becomes obvious. It can be constructed in many different ways, for example the logic circuit 35 may contain three gates, each one associated with one of the output lines 36a, 36b, 36c, which gates receive the trigger pulses from trigger generator 32, in parallel, and which are selectively opened or closed by the threshold stages 34a, 34b. If no output signals are received from either one of the threshold threshold stages 34a, 34b, only line 36a is enabled; upon response, for example, of threshold stage 34a, the output 36a becomes blocked and only 36b will be energized; upon response of threshold stage 34b, only output line 36c is energized, the other two being blocked. The firing or trigger pulses thus are applied always at proper times, as determined by the trigger pulse generator 32, and on the proper line, to the three triacs of the group which are associated with the respective phases of the alternator 1 (FIG. 1). In a preferred form, coupling is done by an opto-coupler so that no feedback will result from the control gates of the triac. Opto-couplers, usually, include a luminescent diode and a photo transistor.

The distribution logic 35 is connected to a group of coupling circuits 38, which include the opto-couplers of which only one is shown schematically at 36a 38a, symbolically, for all nine opto-couplers, that is, associated with the three triacs of the three groups. Triac 39 is shown in FIG. 2, representative of all of the triacs shown in FIG. 1, having an anode A, a cathode c, and a control gate G. Control of the respective gates of the triacs is effected by the respective opto-couplers 38 over amplifiers generally shown at 40a, 40b, 40c. The amplifiers 40a, 40b, 40c have respective individual current supply sources 41a, 41b, 41c which, in the simplest form, are merely current supply rectifiers which derive the required gate trigger power directly from the a-c network, that is, for example from the phase terminals R, S, T, as schematically shown in FIG. 2. The respective switching connections, for proper phasing, are also illustrated, schematically, in FIG. 2.

The system includes, additionally, a voltage-stabilized supply 42 which, for example, in a 12-volt network provides a stabilized output power at 5 V. It receives its power preferably from the on-board network or the battery. The system thus can operate even under extreme battery low-voltage conditions. Optical transfer of ignition trigger pulses to the control gates of the triacs is preferred since the triacs which are, respectively, are on respectively three different phase voltages.

Operation: Let it be assumed that the alternator is designed for a nominal battery voltage of 12 V, that is, having for an example an output voltage of 14 V at 35 A. Matching of load to speed is carried out, as illustrated in FIGS. 1 and 2, in three stages; switch-over of the transformation ratio is done at the a-c side over triacs. The stepping of the three-phase transformation is in accordance with the ratio 1:2:4.

Figure 3:
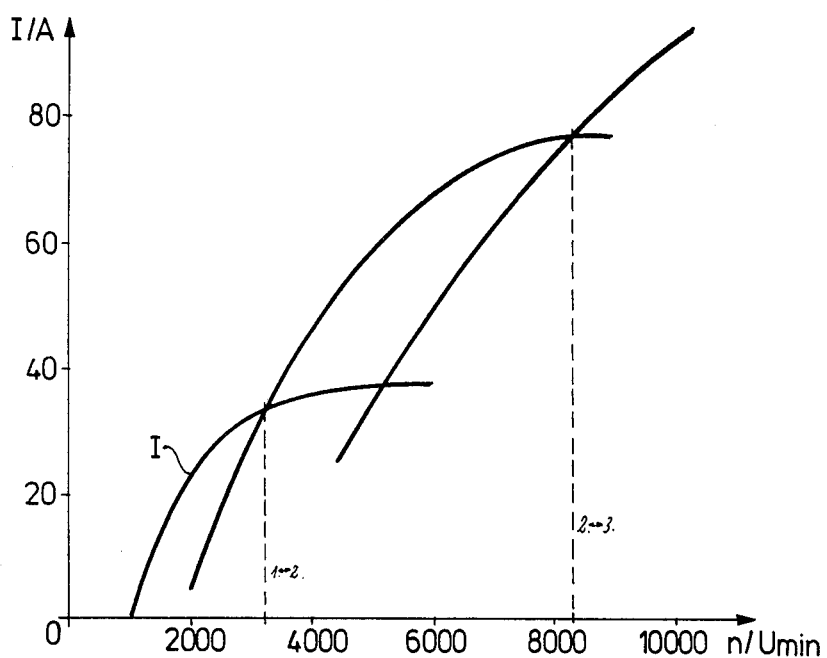
FIG. 3 shows a series of graphs of current (ordinate) vs. speed characteristics with various transformer ratios.

Referring to FIG. 3, the following current data were obtained:

| Secondary Current | 1st Stage | 2nd Stage | 3rd Stage |
| --- | --- | --- | --- |
| continuous | 35 A | 50 A | 70 A |
| 15 minute peak | 35 A | 70 A | 140 A. |

FIG. 3 clearly shows that, if the first stage were retained beyond a speed of about 3000 rpm, which would correspond, for example, to normal operation of the alternator selected, a maximum output of about 35 A will be available. The curve approaches, asymptotically, the nominal current of 35 A, that is, a horizontal line thereat, regardless of eventual operating speed. By changing over, and switching to the second stage, the current which can be obtained from the same alternator practically doubles. Transition of switching between the various stages will depend on the setting of the threshold levels of the threshold circuits 34a, 34b. The selection of the levels will depend on optimum switch-over, in the light of the transformer taps which are available, so that, at the same speed, the respective same current will be available at the respective tap. Thus, switch-over is preferably done at the intersection of the respective curves, between stage 1 and 2 at somewhat over 3000 rpm, and between stages 2 and 3 at somewhat over 8000 rpm.

The association and sequential switching of the transformer as well as the switches, and the selection of the number of stages to be used, is essentially a design and engineering question, depending on costs of manufacture and wiring. More stages permit closer matching; fewer stages are less expensive. The second embodiment, illustrated in FIGS. 4 and 5, utilizes only a single switch-over, that is, two-stage operation. The second embodiment also illustrates another feature, namely association of the switching with the secondary of the transformer. Since this permits utilization of controlled semiconductor switches of the thyristor type in parallel to rectifier diodes, which are used anyway, the thyristors can replace rectifier diodes, thus requiring only half the number of components and costs, with only slight decrease in operating effectiveness.

Figure 4:
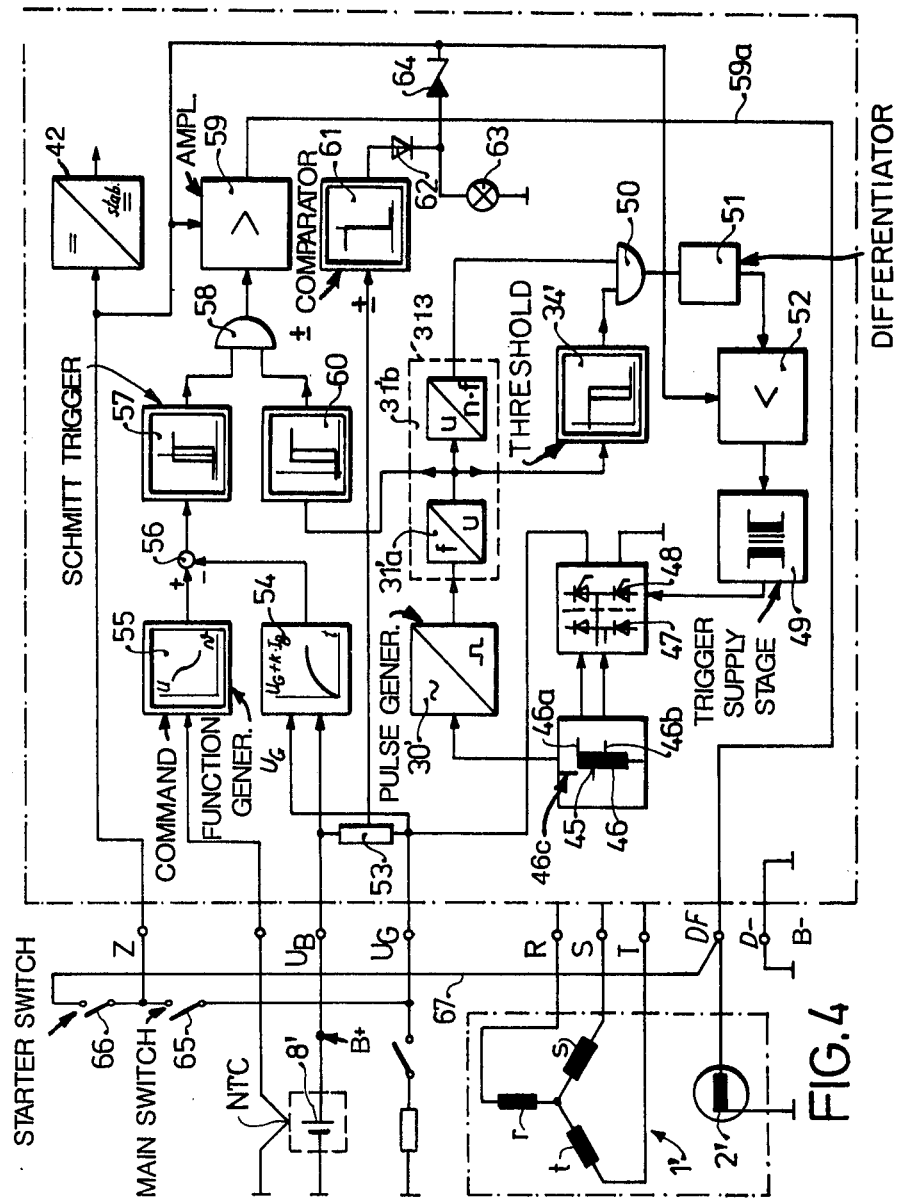
FIG. 4 is a block diagram of another embodiment of the invention in which transformer control and impedance matching is effected at the secondary.

FIG. 4 illustrates yet another feature: A voltage control is additionally provided in which, within a stage, the field current voltage regulator has control current applied thereto from the switch-over network.

Embodiment of FIG. 4: The improvement in operating efficiency and power output is simplified with respect to the arrangement of FIG. 1; the first stage of rectification is carried out by the ordinary rectifier diodes which are present in any system, anyway.

Only one of the phases is illustrated in FIG. 4; the same system is applicable, of course, to the other two phases as well, which are similarly controlled. Thus, a circuit similar to the distribution logic 35 and coupling circuits 38 would be used in addition to the circuit of FIG. 4, in accordance with well known and standard network design.

The outputs R, S, T from the three phase windings r, s, t of the alternator 1' are connected to the primary terminal 45 of one phase winding 46 of a three-phase transformer. This transformer is so connected that its secondary winding has taps. The secondary winding has taps 46a, 46b which, selectively, are connected in circuit as determined by controlled switches, controlling energization of the respective stages. Only two stages are used which, by selective control, provide output from the respective taps 46a, 46b of the secondary. One of the switches is the rectifier diode of the rectifier bridge which would be provided for the alternator 1' in any event. These rectifiers of the bridge are, collectively, shown at 47. Of course, only one of the phases is shown in FIG, 4, the other two phases being connected similarly, for example as shown in FIG. 1. In parallel to the diode bridge, and in accordance with a feature of the invention, a second, similarly connected bridge is provided which, however, is not formed of diodes but, rather, of thyristors which have control gates. The thyristors block current flow in opposite direction, so that they can simultaneously provide the output power rectification function. Thus, plus and minus-thyristors 48 are provided. The thyristors receive trigger pulses from a trigger supply stage 49, for example a trigger transformer.

Operation: Upon application of firing pulses to the thyristors, which are connected to the upper tap 46a of the transformer 46, power from the respective phase winding is transformed and supplied at the transform ratio. The higher voltage applied to the thyristors 48 causes the rectifier diodes 47 to block. If the thyristors 48, however, do not receive gate pulses, the thyristors will be blocked and the lower voltage applied to the lower tap 46b will cause the diodes 47 to conduct and to provide rectified output. Depending on the selection of the transformation ratio ü of the transformer, the alternator 1' will see a load impedance $R_L \cdot ü^2$; at the appropriately matched impedance, it will provide a consequently higher power output.

The trigger or firing pulses for the thyristors 48 are derived from a square-wave signal obtained through wave-shaping in the pulse generator 30', similar to pulse generator and wave-shaping stage 30, FIG. 2. The speed-dependent signal can be obtained, also, from an additional winding 46c wound on the transformer; FIG. 4 only shows one phase portion 46. The wave-shaping and pulse generation stage 30' here again has a smoothing or filtering circuit, a voltage limiter and a trigger stage. The output frequency of the stage 30' is multiplied, again, to obtain a 30°-el. output, for example by multiplication by 12 in a combined multiplication-voltage conversion stage 313, to control an output AND-gate 50. The multiplication stage, preferably, again is a PLL circuit with a counter, since the frequency phases should be multiplied by a fixed factor, in proper phase relation, the factor n=12 being preferred. The PLL circuit has a multiplication stage and a frequency conversion stage 31'a. The frequency proportional voltage derived from stage 31'a is applied directly to a threshold stage 34'. A simplification, as discussed also in connection with FIG. 2, can also be introduced here: the digital-analog conversion of the output from the frequency multiplication stage 31'a is connected to also supply the frequency multiplication stage 31, so that the D/A conversion function of stage 313 can be eliminated.

The trigger stage 34' permits passage of pulses derived from the frequency multiplier 31'a only below a predetermined speed. The trigger signals which are passed by gate 50 are applied to a differentiator 51, corresponding to the trigger pulse generator 32 of FIG. 2, to be applied to an amplifier 52 for application to the trigger supply stage 49.

The threshold stage 34' permits passage of pulses derived from the stage 313 only below a predetermined speed, so that the thyristors are fired only up to that predetermined speed.

Figure 5:
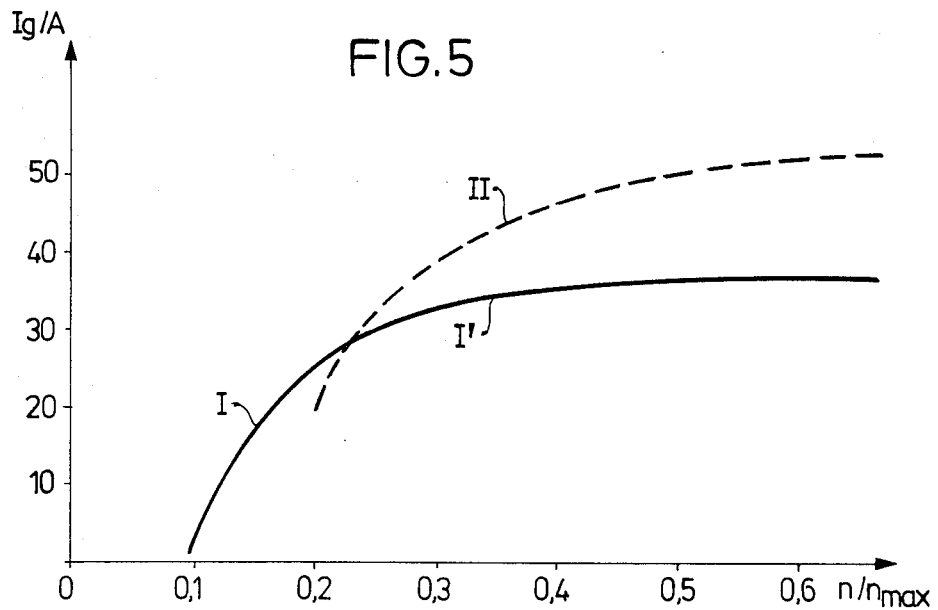
FIG. 5 is a graph of generator current with respect to percentage of maximum alternator speed for the system of FIG. 4.

FIG. 5 clearly illustrates the improvement in matching from the limiting and switch-over speed ranges. As shown, the switch-over may be, for example, at about 25%, for example approximately 2450 rpm, after which the second stage will be energized. The alternator, again, is a nominal 35 A alternator, so that, with two stage switch-over, a maximum secondary current of about 55 A can be obtained.

The improvement in generator output was determined in connection with a city course and the European-exhaust emission test cycle, using transformer ratios $ü_1=0.7:1$ and $ü_2=1.5:1$. The speed-dependent switch-over point, as determined by the threshold switch 34', is selected at the intersection of the load characteristic I of the first stage—see FIG. 5—which, behind the intersection, becomes approximately horizontal, see curve I'. By matching the load, in accordance with the present invention, the second stage of the transformer is switched in, which will result in the curve II shown in broken lines.

The circuit provides switching signals which also permit easy control of the field current voltage regulator. FIG. 4 illustrates such a system.

A measuring shunt 53 which, merely, need be a portion of the battery cable, has a voltage signal corresponding to alternator output voltage $U_G$ applied to a function generator 54. The function generator 54 also has the battery voltage applied. The function generator 54 includes at least an operational amplifier connected as a difference circuit. The differential inputs of the operational amplifier have the respective voltages across the measuring shunt 53 applied thereto, preferably over two voltage dividers which are of slightly different division ratio. The function generator provides an actual output voltage, corrected for charge current, namely:

$$U_G + R_{iBatt} \cdot I_{BL} = U_{corr.act.} \qquad (1)$$

wherein $U_G$ is generator voltage; $R_{iBatt}$ is the internal battery resistance; and $I_{BL}$ is the battery charging current. This corrected actual voltage signal $U_{corr.act.}$ is algebraically summed with a temperature-dependent command battery voltage in a summing circuit 56. The command battery voltage is obtained from a function generator 55 which receives a battery-dependent temperature input signal from a negative temperature coefficient resistor NTC which is positioned in temperature-sensing relationship to the battery, for example by being adhered to the case thereof. The algebraically summed signal at summing point 56—actually it is a difference signal—is applied to a threshold circuit formed, for example, by a Schmitt trigger 57. Comparison between the command signal from function generator 55 and the actual signal from the function generator and comparator 54 can also be carried out in the Schmitt trigger by suitable connection thereof. The command battery voltage, or desired battery voltage, is obtained from the function generator 55 under control of the NTC resistor 10 which senses the temperature of battery 8'. The Schmitt trigger conrols an AND-gate 58 to provide an on-connection command to energize the exciter field through an amplifier 59 if a further trigger stage 60, for example also a Schmitt trigger, permits the gate 58 to open or become conductive. The trigger stage 60 is connected to receive output signals, either in analog or digital form, representative of engine speed, from the pulse generator 30' and stage 313, for example by receiving speed-proportional voltages from the frequency-voltage conversion circuit 31'a. The gate 58, thus, will be opened or enabled only if a certain minimum speed is exceeded. This minimum speed is preferably set to be just below the starting speed. As soon as that speed is reached, and, upon connected main switch 65, battery voltage is applied to the field or exciter winding 2' of the alternator. This operation is effected during operation of the vehicle, that is, upon start-stop operation. During starting, actually, a terminal 66 on the starter switch overrides the control effected by amplifier 59 over its output line 59a.

FIG. 4 illustrates a further desirable feature, readily obtainable by using the circuit, with but few additional components. Insufficient alternator output can be determined by a comparator 61 which, for example, senses the direction of current flow through the shunt 53, as schematically indicated by the plus/minus sign of the input to element 61. A diode 62 is connected to the comparator 61 to energize the customary charge control lamp 63. The charge control lamp 63 can be additionally energized upon excessive voltage conditions, that is, by connecting a Zener diode 64 between the main switch 65, at terminal Z, and the junction between diode 62 and lamp 63, lamp 63 being energized upon breakdown of the Zener diode 64. To distinguish, for example, between excessive and low voltage, the diode 62 may have a resistor connected in series therewith so that, upon energization only of the diode 62, the brightness level of lamp 63 differs from that upon breakdown of the diode 64; other distinguishing circuits, or example use of another or additional indicator lamp, with an isolating diode, may be used.

With slightly additional material requirement, the reference instants for firing of the respective thyristors 48 can be derived not only from one of the phases but, rather, from the respectively associated phase. The starter switch terminal 66 is provided to apply energization power to the field winding 2' of the alternator 1' upon starting only, connection of the energization terminal 66 being to the main switch 65 and to the terminal DF over a connecting line 67.

The basic concept of the present invention, thus, is to match the current supply and power output of electrical generators, preferably three-phase alternators of the automotive type with the load. This permits substantial increase in power output and operating efficiency without change of the design parameters of the generator as such. The load resistance, that is, the total load connected to the on-board network, including the internal resistance of the battery, is matched to the change in inner resistance of the generator as it changes with generator speed. Transformer elements are used which, by selective energization of switches, control the taps on transformer windings. The switches are selectively energized entirely automatically under control of speed of the alternator. For predetermined taps of the transformers, the same switches are used, so that a continuously conductive connection from the alternator to the battery, and hence the on-board network and load L is provided, in dependence on alternator speed.

The invention is applicable equally to single-phase and multi-phase use; it is, of course, possible to use either single or multi-phase transformers in power and economy winding arrangements, by providing a plurality of taps which are arranged either on the primary or secondary side of the transformers, and then provide for suitable switching. If the switching and tap points are arranged on a secondary, the switches, preferably, can form at the same time rectifier elements for the on-board vehicular network. If the switches are on the primary, then they are preferably a-c switches, that is, conductive in both directions. Semiconductor switches of the triac type are preferred.

If secondary switching is used, semiconductor switches of the thyristor or SCR type are used, which block in one direction and thus form, simultaneously, a portion of the rectifier of the rectifier array to supply direct current to the on-board vehicular network from an alternating supply.

The invention has been explained, specifically, in connection with an automotive-type on-board network, utilizing semiconductor switches in the form of triacs or SCRs or thyristors. Single-phase generators, and the like, may also be used, and other types of switches can be connected to the transformers, provided they carry out the function explained in the specification.

Various changes and modifications may be made, and features described in connection with any one of the embodiments may be used with any of the others, within the scope of the inventive concept.

The graphs of FIG. 3 show the output current available from the rectifier. Due to the higher speed, the alternator can operate at an output voltage in excess of its nominal voltage of 14 V which, by the transformer, is then appropriately matched to the nominal output voltage at the terminals D+, D− of the voltage regulator with respect to the reference, given, for example, by a Zener diode. In FIG. 5, the solid-line curve I-I' shows the alternator current; the broken-line curve II then shows the additional current output available from the rectifier upon suitable switchover of the transformer 46. The voltage regulator 3 responds only to the output voltage at terminal D+ which, upon fully charged battery 8, will be only slightly above that of the battery voltage B+. The alternator output voltage at terminals R, S, T is not controlled. The diodes of the diode array 4 have to be dimensioned to carry the substantially higher current available from the alternator by the system described. The thyristors 48 (FIG. 4) can be dimensioned to carry the current in accordance with the rating of the alternator, in the example selected 35 A at 12 V; the diodes 47, however, will have to be dimensioned to carry the higher output current. The line 59a (FIG. 4) can be serially connected between the terminals DF and D− of the voltage regulator—which then must be of the ungrounded type—to permit effective use of the inhibition of voltage control below the respective speed as determined by the trigger 60 or by substantial difference between commanded and actual voltages in view of the temperature of the battery, as determined by the Schmitt trigger 57. Overloading of the battery and/or the alternator thus is prevented, while still permitting excitation of the alternator under starting conditon by providing the starter-energization switch 66.

I claim:

1. Method of increasing the operating efficiency and supplying current of on-board vehicular networks having an a-c generator (1) subject to widely varying operating speed and loads;

a battery (8), and loads (L) selectively connectable to the battery;

a rectifier network (4) rectifying the output from the a-c generator and connected to charge and supply the battery (8) and the loads (L)

comprising the steps of determining the speed of operation of the generator by analyzing the frequency of the output of the generator and obtaining a speed signal (1a) representative of the speed of operation of the generator;

matching the internal impedance of the generator to the impedance of the battery and load, as the speed of the generator changes, under control of said speed signal, by connecting a transformer of variable transformation ratio between the generator and battery and load;

and changing the transformation ratio of the transformer in dependence on said speed signal.

2. Method according to claim 1 wherein the step of changing the transformation ratio comprises providing a transformer with a tapped primary;

connecting the secondary of the transformer to the rectifier network;

and selectively connecting the taps of the primary to the output of the generator.

3. Method according to claim 1, wherein the step of changing the transformation ratio comprises providing a transformer with a tapped secondary;

connecting the primary to the output of the generator;

providing controlled rectifiers (48) in said rectifier network;

selectively connecting the taps of the secondary to controlled rectifiers;

and selectively energizing the controlled rectifiers for conduction to provide rectified output, from selected taps of the transformer.

4. Method according to claim 1, including the step of determining a predetermined current level of the generator;

and a matching step comprises changing the transformation ratio, as a function of speed, at speed levels at which, regardless of transformation ratio, at least approximately the same predetermined level of current is derived from the secondary of the transformer.

5. Apparatus to increase the operating efficiency and the current supply of on-board vehicular networks comprising an a-c generator (1) subject to widely varying operating speeds;

a battery (8), and loads (L) selectively connectable to the battery;

a rectifier network (4, 47, 48) rectifying the output from the a-c generator and connected to charge and supply the battery (8) and the loads (L), and comprising, in accordance with the invention, a transformer (9; 46) having at least one winding having taps (12, 13, 14; 46a, 46b) thereon to provide for variable transformation ratios, connected between the generator output and the rectifier network;

speed signal generating means (1a, 31, 32, 313) connected to the generator and deriving a speed signal representative of the speed of operation of the generator;

controlled switching means (15a-c; 16a-c; 17a-c; (48) connected to the taps of the at least one output winding, and selectively connecting a tap of the transformer winding in the rectifier networks;

and control circuit means (19, 30, 31, 33, 32, 34a, 34b, 35) responsive to the speed signal and being connected to and controlling, selectively, the connection of the controlled switching means to match the internal impedance to the impedance of the battery and load as the speed of the generator changes.

6. Apparatus according to claim 5, wherein the a-c generator is a three-phase generator;

and the transformer comprises a separate phase winding connected to each phase of the generator.

7. Apparatus according to claim 6, wherein the generator is a multi-phase generator;

and the transformer comprises a multi-phase transformer of equal phases, having separate phase windings.

8. Apparatus according to claim 5, wherein the transformer has primary and secondary windings;

the transformer primary has at least two taps (12a, 13a, 14a; 12b, 13b, 14b; 12c, 13c, 14c);

the controlled switching means comprises controlled a-c switches (15a, 15b, 15c; 16a, 16b, 16c; 17a, 17b, 17c) connected between the phase output terminals (R, S, T) of the generator and a respective tap of the transformer winding, to connect the respective phase winding (9a, 9b, 9c) to the respective phase.

9. Apparatus according to claim 6, wherein the transformer (46) comprises a secondary winding having at least two taps (46a, 46b);

and the controlled switching means comprises a unidirectionally conductive control switch (48) forming part of the rectifier network.

10. Apparatus according to claim 5, wherein the control circuit means comprises a firing pulse generator circuit controlling operation of the controlled switching means, including a frequency multiplier (31'a, 31) generating output pulses forming a multiple of the frequency of operation of the a-c generator;

and connecting circuits means (35, 38; 59, 52) to connect firing pulses to the controlled switching means.

11. Apparatus according to claim 10, wherein the speed generating means includes threshold circuit means (34a, 34b; 34') providing speed signals representative of selected operating speed levels of the generator.

12. Apparatus according to claim 11, wherein the at least one transformer winding has more than two taps;

and a distribution logic circuit (35, 38) is provided, connected to the threshold circuits (34a, 34b), and selectively distributing the trigger pulses to selected ones of the transformer taps in accordance with response of the threshold stages to speed signals representing predetermined speed levels, for association of said speed levels with respective taps of the at least one winding and energization of the controlled switch means controlling current flow through the respective taps.

13. Apparatus according to claim 6, wherein the controlled switch means comprises controlled semiconductor switches (15, 16, 17; 48);

and the control circuit means includes means generating trigger pulses at a frequency which is a multiple of the operating frequency of the generator and a pulse generator stage (32; 51) connected to receive said multiple frequency pluses and connected to and controlling energization of the controlled semiconductor switches.

14. Apparatus according to claim 13, wherein the frequency multiplier stage provides frequency-multiplied signals in phase synchronism with the output current supplied by the a-c generator (1).

15. Apparatus according to claim 14, wherein the frequency multiplier stage comprises a phase-locked loop circuit.

16. Apparatus according to claim 13, wherein the control circuit means further includes a digital-to-analog converter and at least one voltage sensitive threshold stage (34a, 34b, 34') connected to the digital-to-analog converter and responsive to a voltage representative of speed of the generator.

17. Apparatus according to claim 16, wherein at least two threshold stages (34a, 34b) are provided;

and the control circuit means further includes a steering circuit (38) having output lines connected to the controlled switch means and steering control pulses to the controlled switching means from the frequency multiplier stage to the respective controlled switching means in accordance with the response of the threshold stages responding to different speed levels of operation of the generator.

18. Apparatus according to claim 7, wherein the control circuit means comprises opto-couplers (38a);

and the controlled switch means includes controlled semi-conductor switches (15, 16, 17; 48) having gate electrodes which are controlled by said opto-couplers.

19. Apparatus according to claim 18, further including amplifiers (40a, 40b, 40c; 52, 49) connected between the opto-couplers and the gate electrodes of the controlled semiconductor switches.

20. Apparatus according to claim 7, wherein the rectifier network comprises a semiconductor rectifier bridge network;

and the controlled switch means comprises controlled unidirectionally conductive semiconductor switching elements having their main current carrying paths connected in parallel to the rectifier diodes of the bridge rectifier for simultaneous rectification, the conductive paths of the diode rectifiers and of the controlled semiconductor switching rectifiers being connected to different taps of the transformer, the control circuit means, selectively, energizing the controlled semiconductor switches or leaving them in blocked condition to provide, selectively, output from the taps of the transformer upon conduction of the respective controlled semiconductor switch, and rectification thereby or, only, from the semiconductor rectifier diodes upon blocking of the controlled semiconductor rectifier switches.

21. Apparatus according to claim 20, wherein the a-c generator (1, 1') has a field winding (2, 2');

a gate circuit (58) is provided, connected to and controlled to receive said speed signals, and connected to interrupt current supply to the field or exciter winding if the speed signal has a characteristic representative of operating speed of the generator below a predetermined level.

22. Apparatus according to claim 21, wherein the speed level of the generator at which energization of the energizing or field winding is interrupted is set to be the level at which the generator can provide output current just barely sufficient for energization of the field winding thereof, but not for additional power supplied to the battery or the load.

23. Apparatus according to claim 21, wherein the speed signal generating means includes a frequency multiplier stage (31, 31'a) connected to the output of the generator;

and the speed signal is derived from said frequency multiplier stage.

24. Apparatus according to claim 7, further including temperature sensing means (NTC) coupled to the battery (8, 8') in temperature sensing condition therewith;

function generator means (55) connected to receive a temperature sensing signal from the temperature sensing means and providing an output representative of required charging voltage with respect to temperature;

and control circuit means (56, 57, 58) connected to interrupt current supply to the exciter or field winding (2, 2') of the generator (1, 1') if the sensed battery voltage is below a predetermined level.

25. Apparatus according to claim 24, wherein the control circuit means further includes battery voltage sensing means and generator output voltage sensing means (53); comparator means (54) comparing the respective levels of battery voltage and generator output voltage and providing a signal representative of actual voltage difference, said voltage difference signal being compared with the battery temperature signal as derived from the temperature sensing means and the function generator (55) and controlling inhibiting energization of the exciter or field winding (2, 2') of the generator (1, 1') if the difference is outside of a predetermined comparison relationship.

* * * * *

UNITED STATES PATENT AND TRADEMARK OFFICE
CERTIFICATE OF CORRECTION

PATENT NO. : 4,419,618
DATED : December 6, 1983
INVENTOR(S) : Ralf GRETSCH

It is certified that error appears in the above-identified patent and that said Letters Patent is hereby corrected as shown below:

IN THE CLAIMS:

Claim 18, Col. 13, line 41, "...to claim 7..." should be -- ...to claim 5... --
Claim 20, Col. 13, line 51, "...to claim 7..." should be -- ...to claim 5... --
Claim 24, Col. 14, line 34, "...to claim 7..." should be -- ...to claim 5... --

Signed and Sealed this

Twelfth Day of March 1985

[SEAL]

Attest:

DONALD J. QUIGG

Attesting Officer     Acting Commissioner of Patents and Trademarks